United States Patent [19]

Zaydel et al.

[11] Patent Number: 5,306,091

[45] Date of Patent: Apr. 26, 1994

[54] SHEET METAL NUT

[75] Inventors: Wieslaw S. Zaydel, Rochester; Eleonora K. Curti, Bloomfield Hill, both of Mich.

[73] Assignee: Saturn Corporation, Troy, Mich.

[21] Appl. No.: 93,399

[22] Filed: Jul. 19, 1993

[51] Int. Cl.5 .................. F16B 37/02; F16B 39/284
[52] U.S. Cl. .................. 411/175; 411/112; 411/386
[58] Field of Search ............ 411/111, 112, 174, 175, 411/386, 427

[56] References Cited

U.S. PATENT DOCUMENTS 3,426,818  1/1969  Derby .
4,755,090  7/1988  MacFee, Jr. et al. ......... 411/174 X
5,039,264  8/1991  Benn ......................... 411/175

FOREIGN PATENT DOCUMENTS 2492015  4/1982  France ....................... 411/175

Primary Examiner—Neill R. Wilson
Attorney, Agent, or Firm—William A. Schuetz

[57] ABSTRACT

A U-nut in which a pair of axially aligned collars are formed on the opposed plate members of the nut with one of the collars having internal threads for accommodating a bolt and the other of the collars is provided with a reversely bent radially inwardly extending circular projection which serves as a locator for properly locating the nut relative to hole formed in a support panel.

8 Claims, 2 Drawing Sheets

SHEET METAL NUT

This invention concerns fasteners, in general, and more particularly relates to a sheet metal nut which includes an integral self-retaining portion which allows the nut to be located within a hole formed in a panel and to be locked thereto.

BACKGROUND OF THE INVENTION

One type of sheet metal nut which has been proposed for securing panels in place can be see in U.S. Pat. No. 3,426,818, issued on Feb. 11, 1969 in the name of Marshall T. Derby. As shown in the U.S. Pat No. 3,426,818 patent, the Derby nut is formed of a single-thickness metal and includes a top portion, a bottom portion, and a connecting portion that integrally joins the top and bottom portions to define a bifurcation space. The bottom portion is integrally formed with a resilient retainer having an end portion which has a thickness larger than that of the metal of the nut. During installation of the nut on a panel, the end portion on the retainer engages a hole of a panel and positions the nut for receiving a bolt.

The sheet metal nut according the present invention has certain functional similarities to the Derby nut, however, differs therefrom structurally in that, rather than utilizing a resilient retainer of a type described above for locating the nut relative to a hole in a support panel, one of the plate portions is formed with collar provided with a crimped portion. The crimped portion defines a circular nib which is axially aligned with the opening formed in an internally threaded collar provided on the opposed plate portion of the nut. During installation of the nut onto a sheet metal support panel, the crimped portion is adapted to drop into an accommodating hole of the support panel. Thus, the crimped portion serves as a locator for the nut and, in addition, the collar which includes the crimped portion has a similar function with respect to the article being attached to the support panel.

SUMMARY OF THE INVENTION

More specifically, the sheet metal nut made in accordance with the present invention is used with a bolt for connecting a flange of an article to a support panel. The support panel is formed with a retainer opening and an access opening separated from each other by a divider portion integral with the support panel. In the preferred form, the nut comprises an upper plate member and a lower plate member both of which are interconnected at one thereof by a hinge portion which resiliently biases the other ends of the two plate members towards each other. A first cylindrical collar is formed with the lower plate member and has internal threads formed therein for threadably receiving the bolt. A second cylindrical collar is formed with the upper plate member and has a circular crimped portion formed at the juncture of the second cylindrical collar and the upper plate member. The crimped portion extends radially inwardly relative to the associated collar and downwardly out of the plane of the upper plate member towards the lower plate member. In this manner, the crimped portion takes the form of a nib which defines a circular opening having a diameter greater than the major diameter of the threads of the bolt. In addition, the center longitudinal axis of the first cylindrical collar is axially aligned with the center longitudinal axis of the second cylindrical collar. The arrangement of the various parts of the nut is such that when the other end of the upper and lower plate members is inserted into the access opening and is urged into engagement with the divider portion of the support panel, the upper and lower plate members are parted against the bias of the hinge portion and, upon further movement of the sheet metal nut towards the divider portion, the crimped portion of the upper plate member will drop into the retainer opening to locate the nut relative to the support panel and allow the sheet metal nut to receive the bolt for connecting the flange of the article to the support panel.

The objects of the present invention are to provide a new and improved sheet metal U-nut that is self-retaining on a support panel and is provided with a tubular member integrally connected through a crimped portion to one of the plate members of the nut and in which the crimped portion serves as a locator for positioning the nut relative to a hole formed in the support panel; to provide a new and improved sheet metal nut in which a pair of axially aligned collars are formed on the opposed plate members of the nut with one of the collars having internal threads for accommodating a bolt and the other of the collars being provided with a reversely bent radially inwardly extending circular projection which serves as a locator for properly locating the nut relative to a hole formed in a support panel; to provide a new and improved U-nut for use in securing an article to a support panel having an access opening and a retainer opening formed therein and characterized by having a crimped portion formed with one of the plate members that defines a circular opening which is axially aligned with the threaded opening formed in the other of the plate members and serves to locate the nut within the retainer opening of the support panel; to provide a new and improved sheet metal U-nut for use in attaching an article to a support panel and in which one of the plate members of the nut is integrally formed with a collar having a crimped portion located at the juncture of the collar and the associated plate member whereby the body of the collar above the crimped portion serves as a locator for the article and the crimped portion serves as a locator for positioning the nut on the support panel; and to provide a new and improved fastening system for a plastic panel of a vehicle in which a U-nut is provided with a pair of locator portions one of which facilitates the positioning of the U-nut on a support panel of the vehicle while the other serves to facilitate the positioning of the panel onto the U-nut.

Other objects, advantages and features of the present invention will be apparent from the following detailed description when taken with the drawings in which:

DESCRIPTION OF THE INVENTION

Figure 1:
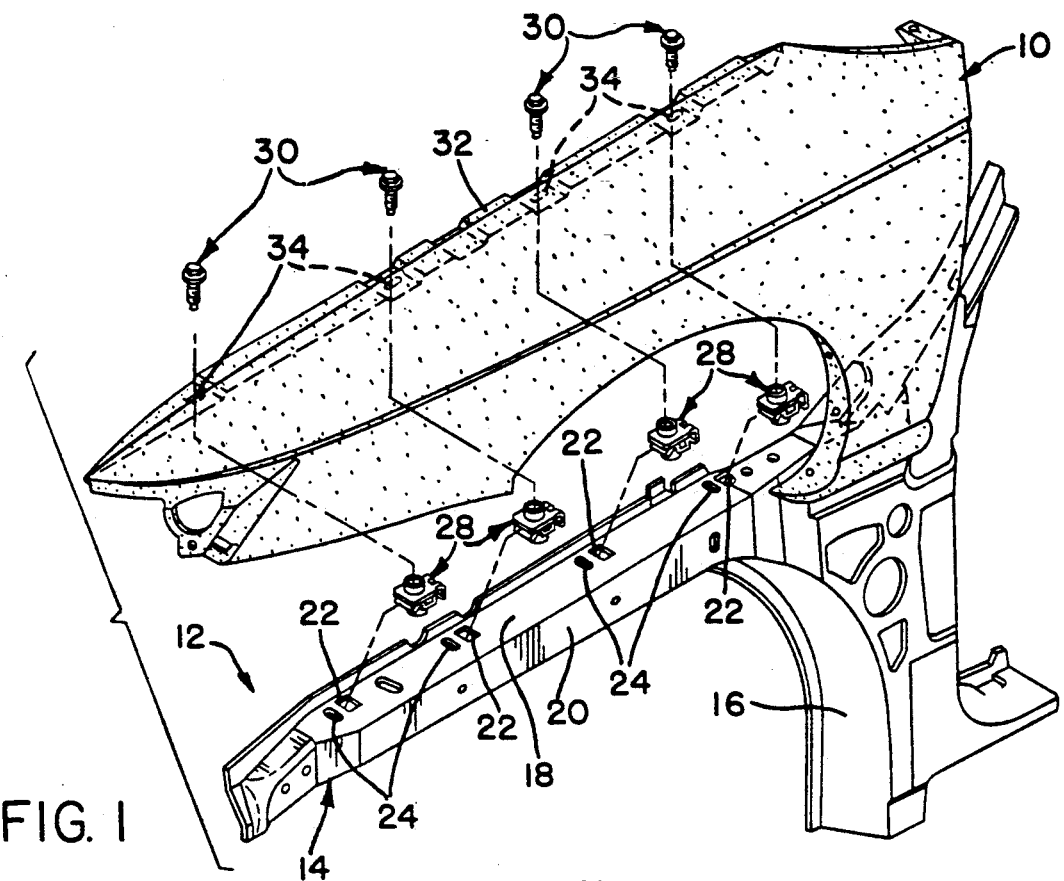
FIG. 1 is a exploded perspective view showing the manner that a fender panel can be secured to a vehicle frame utilizing a fastening system including a U-nut made in accordance with the present invention.
Figure 2:
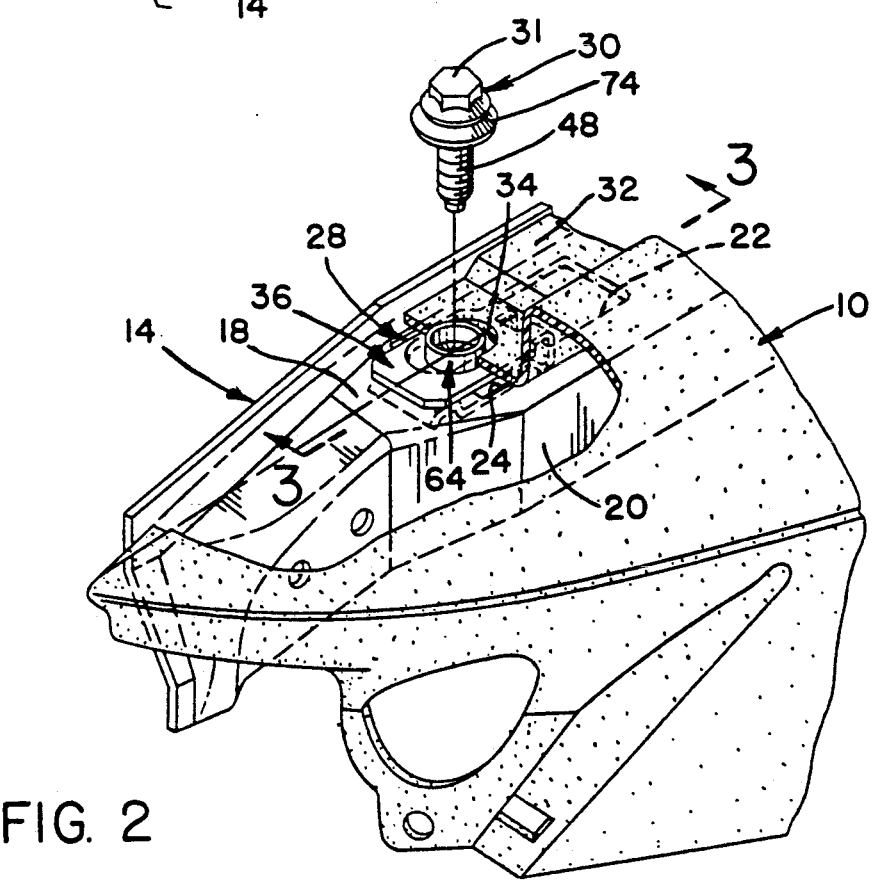
FIG. 2 is an enlarged perspective view of the front end of the fender panel and vehicle frame of FIG. 1 and shows the U-nut mounted on the frame and serving to position the fender panel prior to securement thereof to the frame by a bolt which is threadably received by the U-nut.
Figure 5:
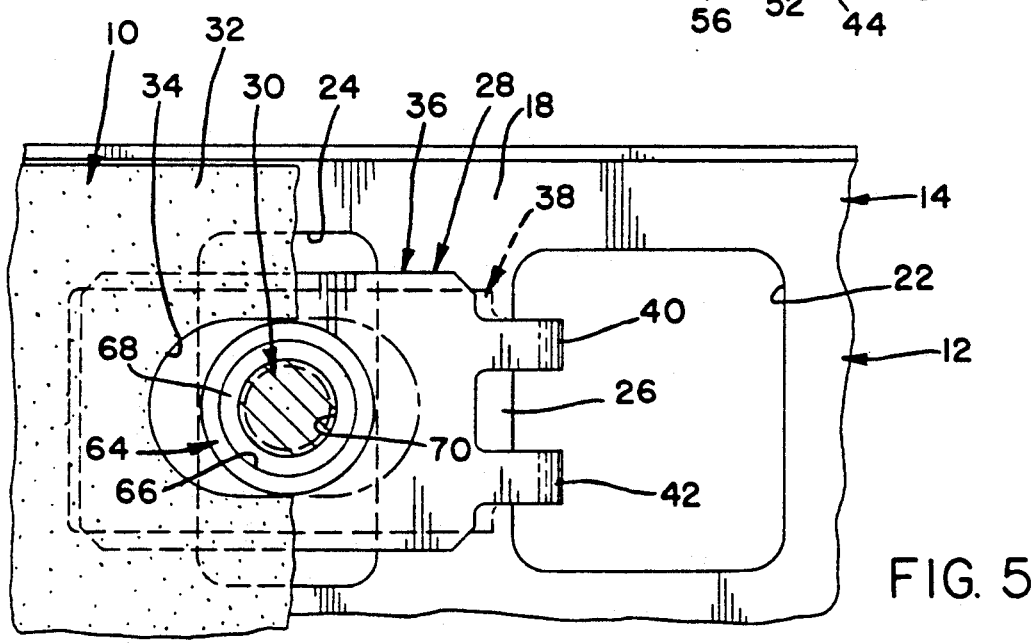
FIG. 5 is a plan view of the U-nut/frame member/fender panel assembly seen in FIG. 3 with the head of the bolt and washer removed and part of the support panel broken away.

Referring now to the drawings and more particularly FIG. 1 thereof, a front fender panel 10 of a motor vehicle is shown that is mountable onto a vehicle sheet metal frame member 12 having a forwardly extending rail 14. The rail 14 is integrally formed with a downwardly extending rear section 16 and serves as a support member which includes a horizontally orientated support panel 18 integrally formed with a vertically orientated side wall 20. As seen in FIG. 5, the support panel 18 of the rail 14 is formed with a plurality of identical pairs of openings one of which is a generally square access opening 22 and the other of which is a generally oblong or rectangular retainer opening or slot 24 with its major axis extending transversely to the longitudinal axis of the rail 14. The access opening 22 and the retainer opening 24, in each instance, are separated from each other by an identical cross bar or divider portion 26 integral with the support panel 18. As seen in FIG. 1, the pairs of openings 22 and 24 are spaced along the longitudinal length of the rail 14 and each pair of openings 22 and 24 is adapted to accommodate a U-nut 28 made in accordance with the present invention for securing the fender panel 10 to the rail 14 of the frame member 12 using a bolt 30 having a head 31.

In this regard, the fender panel 10, in this case, is made of a plastic material and includes a mounting flange 32 having a plurality of identical slots 34 the major axis of each of which is substantially parallel to the longitudinal axis of the associated flange 32 as seen in FIG. 5. The number of slots 34 formed in the flange 32 correspond to the number of retainer openings 24 formed in the support panel 18 of the rail 14 and each of the slots 34 is adapted to receive a portion of the U-nut 28 as will be more fully described below. As seen in FIG. 5, when the flange 32 is mounted on the support panel 18, the major axis of the slot 34 and the major axis of the retainer opening are orthogonally arranged, that is, they cross each other at 90° so that adjustments in the position of the fender panel 10 relative to the rail 14 can be realized for facilitating proper spacing between adjacent panels of the vehicle.

Figure 3:
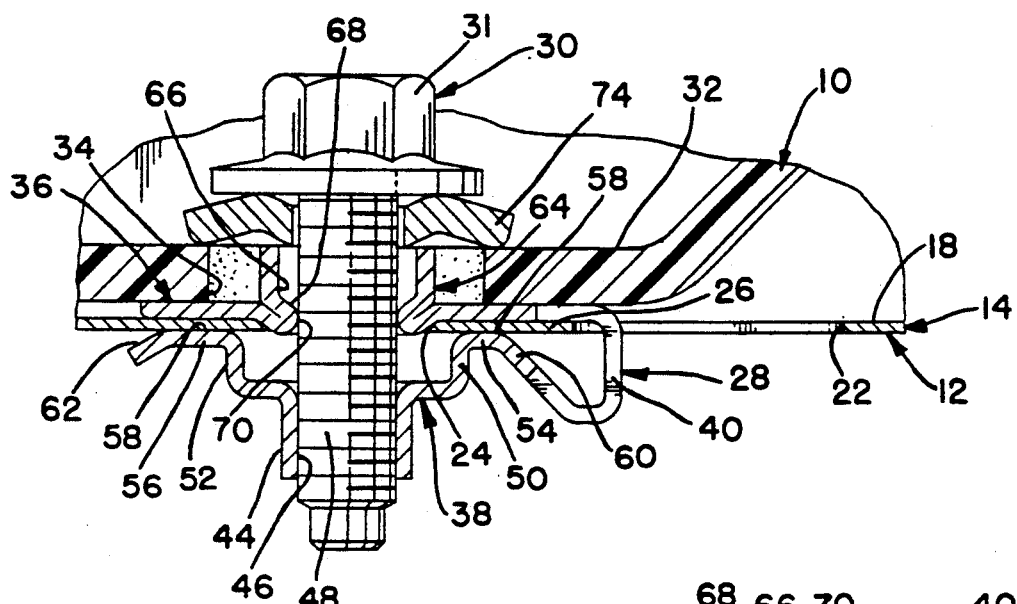
FIG. 3 is an enlarged cross-sectional view taken on line 3—3 of FIG. 2 and shows the bolt threaded into the U-nut for connecting a flange portion of the fender panel to the frame member.
Figure 4:
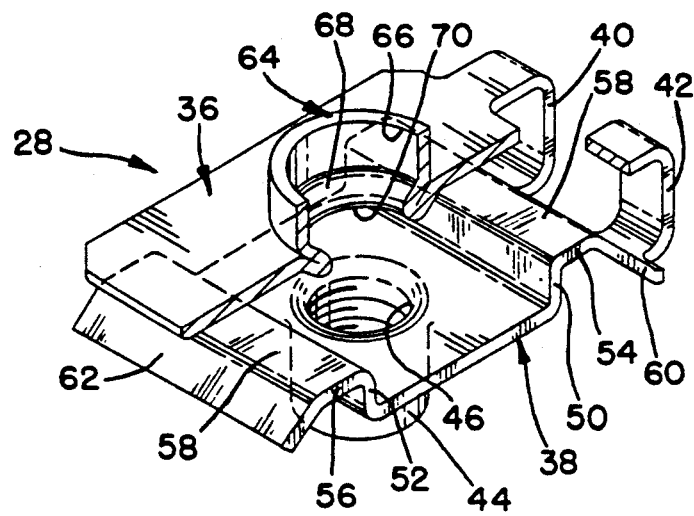
FIG. 4 is a perspective view of the U-nut of FIGS. 1-3 with a part of the upper plate member of the U-nut broken away so as to show the details of construction of the lower plate member.

As best seen in FIGS. 3-5, the U-nut 28 is made of spring steel of a uniform thickness and includes an upper plate member and a lower plate member 38. The upper plate member 36 and the lower plate member 38 are located in substantially parallel planes and are integrally joined together at one end by a pair of laterally spaced and transversely aligned end walls 40 and 42. The end walls 40 and 42 are located in a common plane which is substantially perpendicular to the plane of the upper and lower plate members 36 and 38. The end walls 40 and 42 serve as a resilient hinge continually biasing the other ends of the upper and lower plate members 36 and 38 towards each other.

More specifically, as seen in FIGS. 3-5, the lower plate member 38 is integrally formed with a tubular or cylindrical collar 44 having screw threads 46 formed in its internal cylindrical surface for accommodate the external screw threads 48 formed on the shank of the bolt 30. The lower plate member 38 is also formed with a pair of spaced parallel side walls 50 and 52 the former of which connects to a intermediate portion 54 and the latter of which connects to an intermediate portion 56 each of which is located in a common plane parallel to the plane of the plate member 38 and is provided with a contact surface 58 as seen in FIG. 4. The intermediate portion 54 is integral with a downwardly inclined section 60 which is bifurcated at its lower end and is integral with the end walls 40 and 42. In addition, the intermediate portion 56 is integrally joined to an angled guide portion 62 the purpose of which will be explained hereinafter.

The upper plate member 36 is similarly integrally formed with a tubular or cylindrical collar 64 the inner diameter of which at its upper open end is greater than the crest diameter of the threads 46 in the collar 44 of the lower plate member 38. As seen in FIG. 3, the internal cylindrical surface 66 of the collar 64 is a smooth surface not having any screw threads as provided in the collar 44. Moreover, the center longitudinal axis of the collar 64 is substantially axially aligned with the center longitudinal axis of the collar 44. Thus, the circular openings within the collars 44 and 64, as viewed in FIG. 5, are substantially concentric with each other and allow the shank of the bolt 30 to be centrally located within the collar 64 when it is threaded into the collar 44.

The collar 64 is integrally joined to the main body of the upper plate member 36 and has the metal of the collar 64 reversely bent or crimped at its juncture with the upper plate member, as seen in FIGS. 3 and 4. The crimped portion 68 of the collar 64 extends radially inwardly relative to the collar 64 and, in effect, provides a nib terminating with an edge 70 defining a circle which is substantially concentric with the inner cylindrical surface 66 of the collar 64. In addition, the nib extends downwardly from the upper plate member 36 so that, as seen in FIG. 3, it lies in a horizontal plane below the plane of the lower surface of the upper plate member 38. It will also be noted that the edge 70 of the nib is intended to lie on a circle having a diameter greater than the major diameter of the threads 48 formed on the bolt 30 so that the shank of the bolt 30 can pass through the area of the nib without any interference from the latter.

In securing the fender panel 10 to the rail 14 of the frame member 12, as seen in FIG. 1, each of the U-nuts 28 is initially placed in the access opening 22 from above the rail 14 with the upper plate member 36 in contact with the upper surface of the divider portion 26 and the guide portion 62 of the lower plate member 38 contacting an edge 72 of the opening 22 as seen in FIG. 5. The U-nut 28 is then pushed towards the retainer opening 24 until the crimped portion 68 of the upper plate member 36 drops into the retainer opening 24 which, as seen in FIGS. 3 and 5, is sized so as to capture the crimped portion 68 of the U-nut 28 and allow adjustment thereof along the transverse axis of the rail 14 but prevent any further movement along the longitudinal axis of the rail 14. Once the U-nuts 28 are located in the several retainer openings 24 of the rail 14, the fender panel 10 is mounted on the rail with each of the slots 34 formed in the flange 32 receiving a collar 64 of the U-nut 28. As seen in FIG. 5, each of the slots 34 of the flange 32 is sized so as to be captured by the collar 64 and permit adjustable movement of the fender 10 relative to the collar 64 along the longitudinal axis of the rail 14 but prevent any movement of the fender panel 10 relative to the collar 64 along the transverse axis of the rail 14. The bolt and washer combination is then hand-screwed into the collar 44 of the U-nut 28 at which time any tendency for the U-nut 28 to rotate is prevented by the end walls 40 and 42 contacting the edge 72 of the access opening 22.

Thus, at this point in the assembly of the fender panel 10 to the rail 14, the position of the fender panel 10 can still be adjusted along the length of the rail 14 without causing any movement of the U-nut 28. On the other hand, if the position of the fender panel 10 needs to be adjusted crosswise of the rail 14, movement of the fender panel 10 in that direction results in the U-nut 28 being repositioned along the major axis of the access opening 22. Once the fender panel 10 is positioned in the desired location, each of the bolts 30 is provided with final tightening resulting in the contact surfaces 58 of the lower plate member 38 and the lower contact surface of the upper plate member 36 being drawn towards each other into firm frictional engagement with the support panel 18 so as to prevent any movement of the U-nut 28 relative to the rail 14. At the same time, the head 31 of the bolt 30 acting through the washer 74 maintains the fender panel 10 in the adjusted position.

It should be apparent from the above description that the crimped portion 68 serves as a locator for the U-nut 28 within the support panel 18 while the collar 64 serves as a locator for the fender panel 10 by sizing the height of the collar 64 so that it approximates the thickness of the flange 32. The collar 64 acts as a spacer allowing the plastic fender panel 10 to expand or contract under various thermal loads. In addition, by having the bolt 30 act through the washer 74 which, in turn, acts through the collar 64 to fix the position of the U-nut 28 relative to the rail 14, one obtains sufficient clamping load on the flange 32 while allowing thermal growth patterns of the fender panel 10 under various temperature extremes.

Although the retainer opening 24 is shown as being rectangular in configuration, it should be understood that the retainer opening 24 could be circular in configuration and of a size allowing the crimped portion 68 to be located therein without providing for any adjustability of the U-nut 28 as provided by the oblong retainer opening 24. In addition, the end walls 40 and 42 constituting the resilient hinge alluded to hereinbefore, can be designed so that the clamping force provided by such hinge to the plate members 36 and 38 can be decreased or increased as desired. In other words, the end walls 40 and 42 can be designed so that the upper and lower plate members 36 and 38 exert a predetermined clamping force on the support panel 18 when the U-nut 28 is positioned within the accommodating retainer opening.

Various changes and modifications can be made in the construction of the U-nut 28 described above without departing from the spirit of the invention. Such changes and modifications are contemplated by the inventors and they do not wish to be limited except by the scope of the appended claims.

What is claimed is: The embodiments of the invention in which an exclusive property of privilege is claimed are defined as follows:

1. A sheet metal nut for use with a bolt for connecting an article to a support panel formed with a retainer opening, said nut comprising an upper member and a lower member, a hinge portion integrally formed with and interconnecting said upper and lower members at one end thereof and resiliently biasing the other ends thereof towards each other, a first tubular collar formed with said lower member and having internal threads formed therein for threadably receiving said bolt, a second tubular collar formed with said upper member, said second tubular collar having a crimped portion formed at the juncture of said second tubular collar and said upper member that extends radially inwardly relative to said second tubular collar and downwardly out of the plane of said upper member towards said lower member, said crimped portion defining an opening having a dimension greater than the major diameter of the threads of said bolt, and the center longitudinal axis of said first tubular collar being substantially aligned with the longitudinal center axis of said second tubular collar, the arrangement being such that when said other end of said upper and lower members engages said support panel and is urged toward said retainer opening, the upper and lower members are parted against the bias provided by the hinge portion and upon further movement of said sheet metal nut in the same direction, the crimped portion of said upper member will drop into said retainer opening to locate the sheet metal nut relative to said support panel and allow the sheet metal nut to receive said bolt for connecting said article to said support panel.

2. The sheet metal nut of claim 1 wherein said crimped portion takes the form of a nib when received in cross-section.

3. The sheet metal nut of claim 1 wherein said retainer opening is sized so as to accommodate said crimped portion and prevent further movement of said sheet metal nut relative to said support panel along at least one axis.

4. The sheet metal nut of claim 1 wherein said first tubular collar serves as a locator for said article.

5. The sheet metal nut of claim 4 wherein said first tubular collar is of a height substantially equal to the thickness of said article.

6. The sheet metal nut of claim 5 wherein said bolt acts through said first tubular collar to draw said first and second members towards each other upon tightening of said bolt.

7. A sheet metal U-nut for use with a bolt for connecting a flange of an article to a support panel formed with a retainer opening and an access opening separated from each other by a divider portion, said nut comprising an upper member and a lower member, a hinge portion integrally formed with and interconnecting said upper and lower members at one end thereof and resiliently biasing the other ends thereof towards each other, a first cylindrical collar formed with said lower member and having internal threads formed therein along an axis substantially perpendicular to the plane of said lower member for threadably receiving said bolt, a second cylindrical collar formed with said upper member, said second cylindrical collar having a circular crimped portion formed at the juncture of said second cylindrical collar and said upper member that extends radially inwardly relative to said second cylindrical collar and downwardly out of the plane of said upper member towards said lower member, said crimped portion having the form of a nib defining a circular opening having a diameter greater than the major diameter of the threads of said bolt, and the center longitudinal axis of said first cylindrical collar being substantially aligned with the center longitudinal axis of such second cylindrical collar, the arrangement being such that when said other end of said upper and lower plate members is inserted into said access opening and is urged into engagement with said divider portion of said support panel, the upper and lower members are parted against the bias provided by the hinge portion and upon further movement of said sheet metal nut in the same direction, the crimped portion of said upper member will drop into said retainer opening to locate the sheet metal nut relative to said support panel and allow the sheet metal nut to receive said bolt for connecting said flange to said support panel.

8. The combination of a sheet metal nut and a bolt for connecting a flange of an article to a support panel formed with a retainer opening and an access opening separated from each other by a divider portion of said support panel, said nut comprising an upper member and a substantially parallel lower plate member, an end wall integrally formed with and extending substantially perpendicular to said upper and lower plate members at one end thereof and resiliently biasing the other ends thereof towards each other, a first cylindrical collar formed with said lower plate member and having internal threads formed therein along an axis substantially perpendicular to the plane of said lower plate member for threadably receiving said bolt, a second cylindrical collar formed with said upper plate member and having a length dimension substantially equal to the thickness of said flange, said second cylindrical collar having a circular crimped portion integrally formed at the juncture of said second cylindrical collar and said upper plate member that extends radially inwardly relative to said second cylindrical collar and downwardly out of the plane of said upper plate member towards said lower plate member, said crimped portion having the form of a nib defining a circular opening having a diameter greater than the major diameter of the threads of said bolt, and the center longitudinal axis of said first cylindrical collar being axially aligned with the center longitudinal axis of said second cylindrical collar, the arrangement being such that when said other end of said upper and lower plate members is inserted into said access opening and is urged into engagement with said divider portion of said support panel, the upper and lower plate members are parted against the bias provided by the end wall and upon further movement of said sheet metal nut in the same direction, the crimped portion of said upper plate member will drop into said retainer opening to locate the sheet metal nut relative to said support panel and allow the first cylindrical collar of said sheet metal nut to locate said flange and guide said bolt into said second cylindrical collar for connecting said flange to said support panel.

* * * * *